US 9,193,088 B2

(12) United States Patent
Shirahama et al.

(10) Patent No.: US 9,193,088 B2
(45) Date of Patent: Nov. 24, 2015

(54) CUTTING FLUID EJECTION APPARATUS

(71) Applicant: MINEBEA CO., LTD., Kitasaku-Gun, Nagano (JP)

(72) Inventors: Makoto Shirahama, Tokyo (JP); Yoshikazu Nakamaru, An-Naka (JP)

(73) Assignee: Minebea Co., Ltd., Nagano (JP)

( * ) Notice: Subject to any disclaimer, the term of this patent is extended or adjusted under 35 U.S.C. 154(b) by 185 days.

(21) Appl. No.: 13/683,363

(22) Filed: Nov. 21, 2012

(65) Prior Publication Data
US 2013/0134238 A1    May 30, 2013

(30) Foreign Application Priority Data

Nov. 25, 2011  (JP) ................................. 2011-257767
Oct. 22, 2012  (JP) ................................. 2012-233315

(51) Int. Cl.
  *B05B 13/00*  (2006.01)
  *B26F 3/00*   (2006.01)
  *B23Q 15/007* (2006.01)
  *B23Q 15/22*  (2006.01)
  *B23Q 15/26*  (2006.01)
  *B23Q 11/00*  (2006.01)
  *B23Q 11/02*  (2006.01)

(52) U.S. Cl.
  CPC .............. *B26F 3/004* (2013.01); *B23Q 15/007* (2013.01); *B23Q 15/22* (2013.01); *B23Q 15/26* (2013.01); *B05B 13/00* (2013.01); *B23Q 11/005* (2013.01); *B23Q 11/0075* (2013.01); *B23Q 11/02* (2013.01)

(58) Field of Classification Search
  CPC ........ B26D 5/005; B26D 7/0658; B26F 3/00; B26F 3/004; B23Q 15/007; B23Q 15/22; B23Q 15/26; Y10T 83/364; Y10T 83/0453; Y10T 83/2066; Y10T 83/2068; Y10T 83/141; Y10T 83/145; Y10T 83/148; Y10T 83/152; Y10T 83/159; Y10T 83/162
  USPC .............. 83/24, 98, 99, 177, 72–75, 76, 76.1
  See application file for complete search history.

(56) References Cited

U.S. PATENT DOCUMENTS

| 4,573,833 A | 3/1986 | Kondo |
| 5,186,394 A | 2/1993 | Tsuji |

(Continued)

FOREIGN PATENT DOCUMENTS

| JP | S58-126036 A | 7/1983 |
| JP | 08-243876 A  | 9/1996 |

(Continued)

OTHER PUBLICATIONS

Japanese Office Action issued on May 7, 2015 in the corresponding JP Patent Application 2012-233315.

*Primary Examiner* — Phong Nguyen
(74) *Attorney, Agent, or Firm* — Carrier Blackman & Associates, P.C.; William D. Blackman; Joseph P. Carrier

(57) ABSTRACT

There is provided a cutting fluid ejection apparatus including a cutting fluid ejection nozzle configured to supply a cutting fluid to a tool of a processing machine or a workpiece during processing of the workpiece by the processing machine, a drive motor configured to adjust an ejection angle of the cutting fluid ejection nozzle; and a controller configured to control the drive motor. The controller is capable of performing control in a chip removal operation mode to remove a chip.

15 Claims, 12 Drawing Sheets

(56) References Cited

U.S. PATENT DOCUMENTS

| | | | | |
|---|---|---|---|---|
| 5,361,993 A | * | 11/1994 | Andersson | 239/752 |
| 5,715,852 A | * | 2/1998 | Jepsen | 134/167 R |
| 6,996,452 B2 | * | 2/2006 | Erichsen et al. | 700/160 |
| 7,847,191 B2 | * | 12/2010 | Swift et al. | 174/110 R |
| 2004/0020339 A1 | * | 2/2004 | Gambini | 83/177 |
| 2005/0159840 A1 | * | 7/2005 | Lin et al. | 700/245 |
| 2008/0235970 A1 | * | 10/2008 | Crampton | 33/503 |
| 2009/0084235 A1 | * | 4/2009 | Kata et al. | 83/72 |
| 2009/0199690 A1 | * | 8/2009 | Sun et al. | 83/523 |
| 2011/0208356 A1 | * | 8/2011 | Kato et al. | 700/253 |

FOREIGN PATENT DOCUMENTS

| | | |
|---|---|---|
| JP | 10-118884 A | 5/1998 |
| JP | 10-180585 A | 7/1998 |
| JP | 2003-181740 A | 7/2003 |

* cited by examiner

BACKGROUND ART

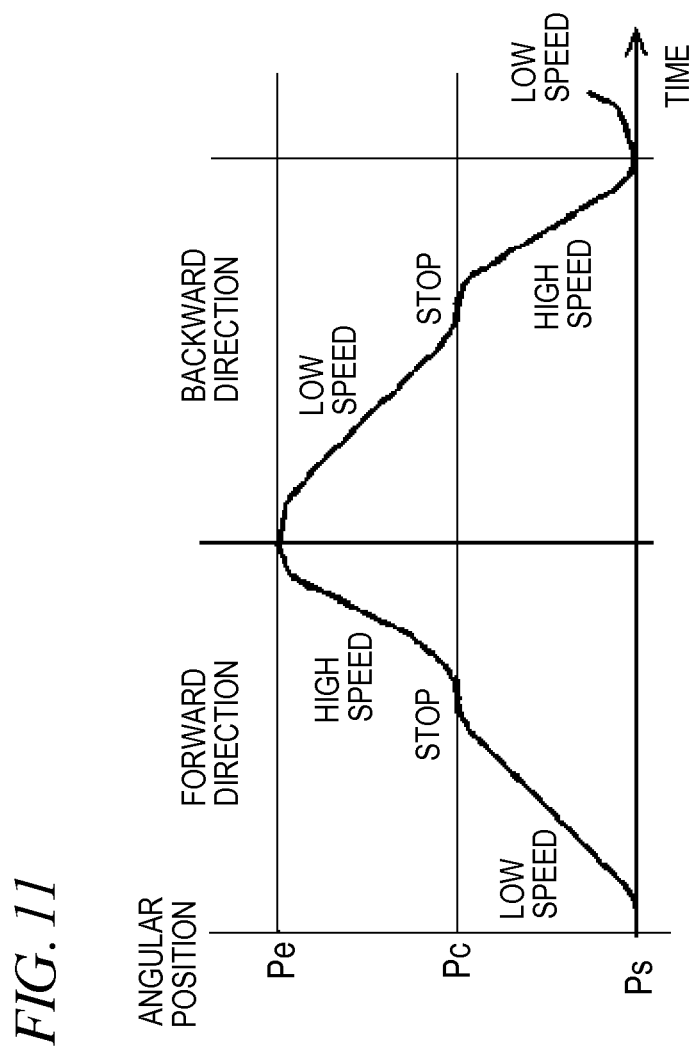

CUTTING FLUID EJECTION APPARATUS

BACKGROUND OF THE INVENTION

1. Field of the Invention

The present invention relates to a cutting fluid ejection apparatus for removing chips which are adhered to a tool of a processing machine such as a NC lathe, a milling machine, or a drilling machine, or a workpiece to be processed.

2. Description of the Related Art

There has been known a cutting fluid ejection apparatus for removing chips which are adhered to a tool of a processing machine such as a NC lathe, a milling machine, or a drilling machine, or a workpiece to be processed (see, JP-A-Hei. 8-243876, for example). This cutting fluid ejection apparatus includes a coolant liquid supply nozzle and a motor for rotationally driving the coolant liquid supply nozzle.

This cutting fluid ejection apparatus is configured to remove the chips which are adhered to the tool of the processing machine or the workpiece by rotationally driving the coolant liquid supply nozzle and supplying a cutting fluid to the tool or workpiece. However, if complex-shaped chips are tangled or caught to the tool or the workpiece, there needs an extra work that the processing machine including the cutting fluid ejection apparatus is temporarily stopped and an operator manually removes the chips. For this reason, there is a problem that the processing machine cannot be continuously operated and thus the processing time cannot be shortened.

In the meantime, there has been known a cutting fluid ejection apparatus capable of removing the chips without stopping the cutting fluid ejection apparatus and the processing machine, even when such chips are tangled or caught to the tool or the workpiece (for example, see JP-A-Hei. 10-118884). This cutting fluid ejection apparatus includes a coolant liquid supply nozzle, a motor for rotationally driving the coolant liquid supply nozzle, and a cutting fluid supply pump. The cutting fluid ejection apparatus is configured to remove the chips by rotationally driving the coolant liquid supply nozzle while adjusting an ejection pressure of the cutting fluid by controlling a pump pressure. However, this cutting fluid ejection apparatus requires a large-size pump for adjusting the ejection pressure of the cutting fluid. Therefore, there is problem that cost of the apparatus is increased and thus cost reduction cannot be achieved.

FIG. 5 is a schematic block diagram showing a general configuration of a related-art cutting fluid ejection apparatus 5. The cutting fluid ejection apparatus 5 supplies a cutting fluid 190 (also serving as a cooling fluid) to a tool 151 of a processing machine including a NC lathe 160 and removes chips adhered to the tool 151 of the processing machine. The cutting fluid ejection apparatus 5 includes a cutting fluid supply device 120 and a controller 130. The cutting fluid supply device 120 is configured to move a cutting fluid ejection nozzle tip 110a at a constant speed Vo in a predetermined angular range by rotationally driving a cutting fluid ejection nozzle 110 to eject the cutting fluid 190. The controller 130 controls the driving of a motor installed in the cutting fluid supply device 120 and the ejection of the cutting fluid 190. The tool 151 is held to a tool holding part 150.

In this cutting fluid ejection apparatus 5, since the cutting fluid ejection nozzle tip 110a is moved at a constant speed Vo in a predetermined angular range, complex-shaped chips which are generated from a workpiece 161 cut by the tool 151 may be caught to the tool 151 and thus may not be removed, even if the cutting fluid is ejected to the tool 151.

SUMMARY OF THE INVENTION

Accordingly, an object of the present invention is to provide a low-cost cutting fluid ejection apparatus capable of effectively removing chips which are adhered to a tool of a processing machine or a workpiece.

According to an illustrative embodiment of the present invention, there is provided a cutting fluid ejection apparatus comprising:

a cutting fluid ejection nozzle configured to supply a cutting fluid to a tool of a processing machine or a workpiece during processing of the workpiece by the processing machine;

a drive motor configured to adjust an ejection angle of the cutting fluid ejection nozzle; and a controller configured to control the drive motor, wherein the controller is capable of performing control in a chip removal operation mode to remove a chip.

According to the above configuration, it is possible to remove complex-shaped chips at once, which are stuck to the tool or the workpiece in a short time without intervention of an operator. As a result, it is possible to effectively remove chips which are tangled or caught or stuck to the tool or the workpiece, even if the tool or the workpiece has various shapes or is made of various materials. Accordingly, a cumbersome work that the cutting fluid ejection apparatus or the processing machine is temporarily stopped and an operator manually removes the chips as required in the apparatus of JP-A-Hei. 8-243876 is not required. Consequently, the processing machine can be continuously operated and thus it is possible to shorten the processing time of the workpiece.

Further, the large-size pump for adjusting the ejection pressure of the cutting fluid as described in JP-A-Hei. 10-118884 is not required. Furthermore, since it is not necessary to manage the flow rate of the cutting fluid, a complicated device such as a flow control valve or a controller thereof which is needed to manage the flow rate of the cutting fluid is not required. Accordingly, it is possible to reduce the manufacturing cost of the cutting fluid ejection apparatus.

In the above cutting fluid ejection apparatus, in the chip removal operation mode, the controller may be configured to change an angular movement speed of the cutting fluid ejection nozzle in an adjustment range of the ejection angle.

According to this configuration, the magnitude or direction of the jet force of the cutting fluid ejected from the cutting fluid ejection nozzle can be instantaneously changed. Accordingly, it is possible to remove the complex-shaped chips which are stuck to the tool or the workpiece.

In the above cutting fluid ejection apparatus, an ejection angle of the cutting fluid ejection nozzle which enables the cutting fluid to reach a chip adhered to the tool or the workpiece may be set as a speed switching point, and the controller may be configured to change the angular movement speed in a vicinity of the speed switching point.

According to this configuration, the magnitude or direction of the jet force of the cutting fluid can be instantaneously changed in the vicinity of the position of the chips which are tangled or caught or stuck to the tool or the workpiece. Accordingly, it is possible to effectively remove the chips which are adhered to various tools or workpieces, for example.

In the above cutting fluid ejection apparatus, an operating start point where an operation of the cutting fluid ejection nozzle is started, an operating end point where the operation of the cutting fluid ejection nozzle is ended, the speed switching point, the angular movement speed and the number of reciprocation of the cutting fluid ejection nozzle in the chip removal operation mode may be set in advance in the controller.

According to this configuration, the movement start point, the movement end point and the speed switching point of the cutting fluid ejection nozzle can be simply set to an optimal condition most effective to remove the chips by the controller in accordance with the shape or material of the tool or the workpiece. Further, the angular movement speed and the number of reciprocation can be simply set to an optimal condition by the controller in accordance with the type or amount of the chips to be removed. Accordingly, it is possible to shorten the time required to change the setting conditions associated with chip removal, when various tools or workpieces are alternately used. In this way, it is possible to enhance the processing efficiency and to thus improve the productivity of the products.

In the above cutting fluid ejection apparatus, in the chip removal operation mode, the controller may be configured move the cutting fluid ejection nozzle at a first speed in a range from the operating start point to the speed switching point, and move the cutting fluid ejection nozzle at a second speed different from the first speed in a range from the speed switching point to the operating end point.

According to this configuration, it is possible to perform chip removal for the chips which are adhered to the tool or the workpiece of various shapes or materials, for example, in addition to being able to be easily set by the controller.

In the cutting fluid ejection apparatus, in the chip removal operation mode, the controller may be configured to gradually decelerate the angular movement speed of the cutting fluid ejection nozzle as approaching the operating end point.

According to this configuration, no overload occurs in the motor or the system and therefore it is possible to avoid the risk of damage to the motor or the system.

In the cutting fluid ejection apparatus, the cutting fluid ejection nozzle may be configured to perform a reciprocating action, and in the chip removal operation mode, when the cutting fluid ejection nozzle reaches the operating end point in a forward direction, the controller may be configured to move the cutting fluid ejection nozzle in a backward direction while the operating start point of the forward direction is replaced with the operating end point of the backward direction and the operating end point of the forward direction is replaced with the operating start point of the backward direction.

According to this configuration, switching from the forwarding direction to the backward direction is smoothly performed and therefore it is possible to remove the chips in a shorter time.

According to the above configuration, it is possible to provide a low-cost cutting fluid ejection apparatus capable of effectively removing chips which are adhered to a tool of a processing machine or a workpiece.

BRIEF DESCRIPTION OF THE DRAWINGS

In the accompanying drawings:

FIG. 11 is a view showing a sixth operational characteristic of a cutting fluid ejection nozzle according to an illustrative embodiment.

DETAILED DESCRIPTION

Figure 1:
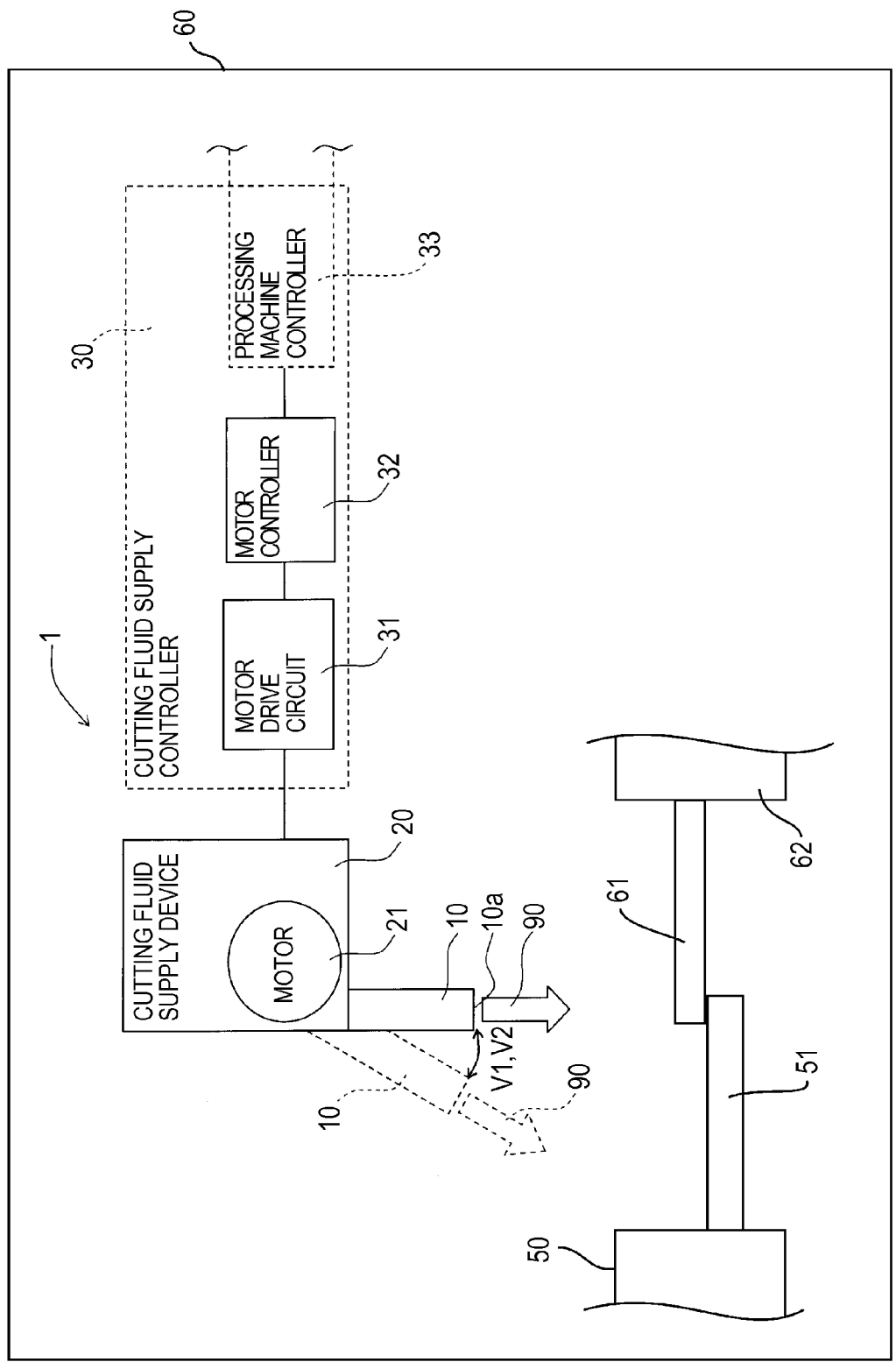
FIG. 1 is a schematic block diagram showing a cutting fluid ejection apparatus according to a first illustrative embodiment of the present invention.

Hereinafter, a cutting fluid ejection apparatus according to an illustrative embodiment of the present invention will be described with reference to the accompanying drawings. FIG. 1 is a schematic block diagram showing the cutting fluid ejection apparatus according to a first illustrative embodiment.

The cutting fluid ejection apparatus 1 supplies a cutting fluid 90 also serving as a coolant liquid to a tool 51 mounted to a NC lathe 60 (an example of a processing machine) and removes chips 65 (see, FIG. 3) attached to the tool 51 of the NC lathe 60. The cutting fluid ejection apparatus 1 includes a cutting fluid supply device 20 and a controller 30. The cutting fluid supply device 20 includes a cutting fluid ejection nozzle 10 to eject the cutting fluid 90, and a motor 21 to change the direction of the cutting fluid ejection nozzle 10. The cutting fluid supply device 20 is configured to move a cutting fluid ejection nozzle tip 10a of the cutting fluid ejection nozzle 10 in a predetermined angular range. The controller 30 controls the driving of the motor 21, the switching of operation modes, and the ejection of the cutting fluid 90. The controller 30 includes a motor drive circuit 31, a motor controller 32 for the motor 21, and a processing machine controller 33.

The cutting fluid ejection nozzle 10 has a base end connected to a cutting fluid supply source (not shown) through the cutting fluid supply device 20 and is configured to eject the cutting fluid 90 supplied from the cutting fluid supply device 20 onto the tool 51. The direction of the cutting fluid ejection nozzle 10 is changed in the predetermined angular range in accordance with the driving of the motor 21, and the cutting fluid ejection nozzle tip 10a is correspondingly moved in a predetermined angular movement speed. In the first illustrative embodiment and a second illustrative embodiment (which will be described later), the speed of the cutting fluid ejection nozzle tip 10a is regarded as the angular movement speed. Further, the angular movement speed V of the cutting fluid ejection nozzle tip 10a is represented as $V = \omega \times r$ where an angular speed of the cutting fluid ejection nozzle 10 rotationally driven by the motor 21 is defined as $\omega$ and a distance from a rotational center of the cutting fluid ejection nozzle 10 to the cutting fluid ejection nozzle tip 10a is defined as r.

The motor 21 is installed inside a housing of the cutting fluid ejection apparatus 1 and driven by a command signal from the controller 30 and the power supplied. A DC motor is used in this illustrative embodiment. The DC motor used in this illustrative embodiment may be a brushed motor or a brushless motor. Meanwhile, a servo motor or a stepping motor may be used, instead of the DC motor used in this illustrative embodiment.

The controller 30 includes the motor drive circuit 31 for supplying a drive power to the motor 21, the motor controller 32 for sending a drive control signal to the motor drive circuit 31 to control the driving of the motor 21, and the processing machine controller 33 for performing an operation control of the NC lathe 60 in a cutting fluid supply operation mode. The processing machine controller 33 controls the switching between the cutting fluid supply operation mode and a chip removal operation mode, and controls the ejection of the cutting fluid in the chip removal operation mode. Herein, FIG. 1 shows only a portion of the processing machine controller 33 which is related to a function of the illustrative embodiment. The cutting fluid supply operation mode refers to a mode in which the cutting fluid 90 is ejected from the cutting fluid ejection nozzle 10 in a state where the cutting fluid ejection nozzle 10 is stationary or reciprocates at a constant speed in a predetermined angular range. Further, the chip removal operation mode refers to a mode in which the chips tangled or caught or stuck to the tool or the workpiece are effectively removed from the tool or the workpiece. An operation principle of the chip removal operation mode will be described later.

Figure 3A:
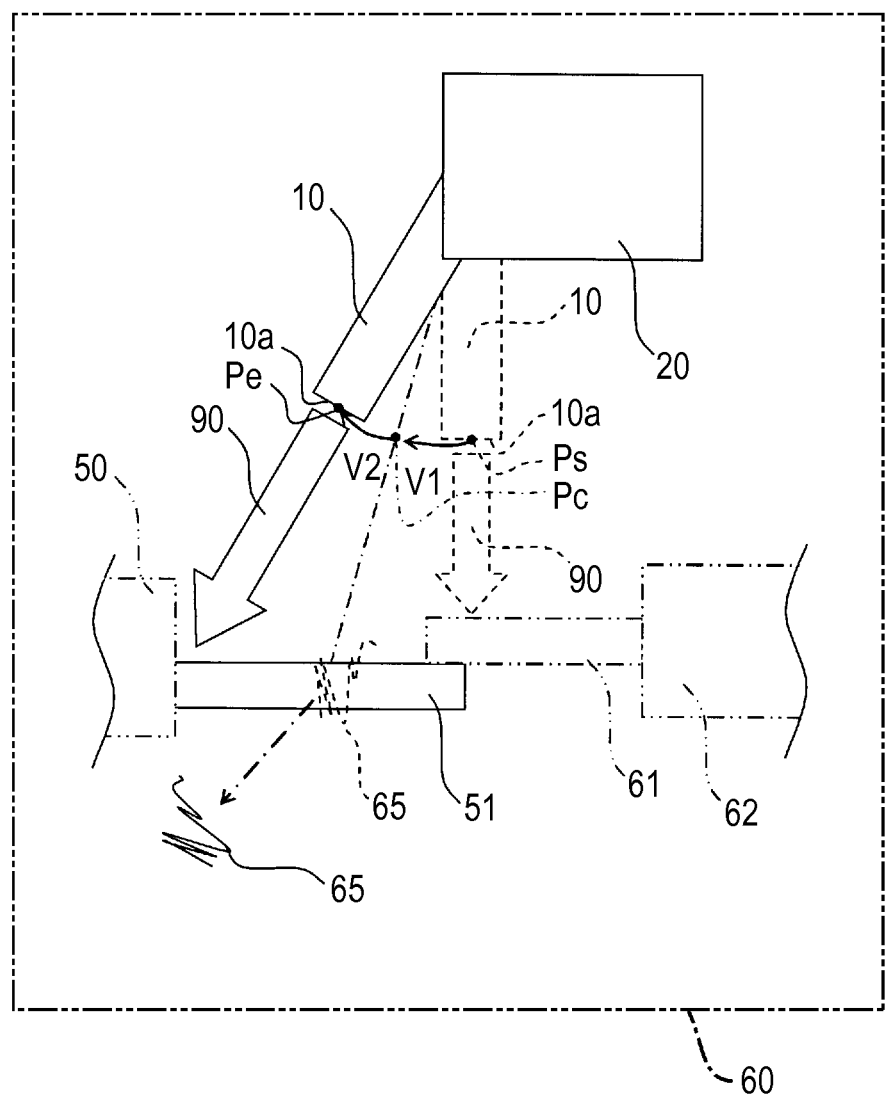
FIGS. 3A and 3B are views for explaining the operation of the chip removal operation mode of the cutting fluid ejection apparatus shown in FIG. 1, and showing a movement of a nozzle tip from a movement start point Ps to a movement end position Pe.
Figure 3B:
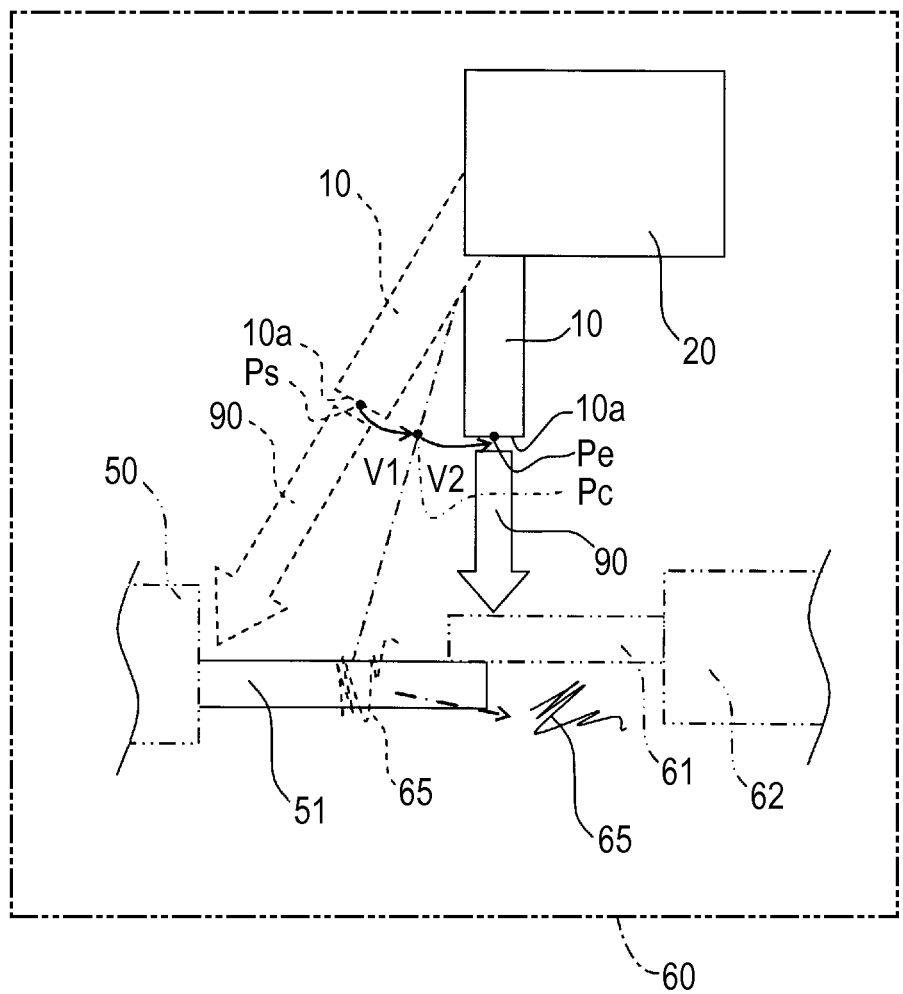

The motor controller 32 includes a memory which stores various setting values used to remove the chips, in advance (see, FIGS. 3A and 3B). For example, the various setting values includes an operating start point, an operating end point, a speed switching point, a first speed V1 and a second speed V2 of the cutting fluid ejection nozzle tip 10a and the number of reciprocation of the cutting fluid ejection nozzle 10 in the chip removal operation mode. Herein, the first speed V1 and the second speed V2 refer to the angular movement speed of the cutting fluid ejection nozzle tip 10a. The motor controller 32 is further configured to control the rotation number (the rotation of the cutting fluid ejection nozzle 10 in a predetermined angular speed) of the motor 21. Meanwhile, the processing machine controller 33 is configured to send an operation mode selection signal to switch between the cutting fluid supply operation mode and the chip removal operation mode, and a command signal for the start and end of each operation mode to the motor controller 32, in addition to the control required to operate the NC lathe 60.

Figure 2:
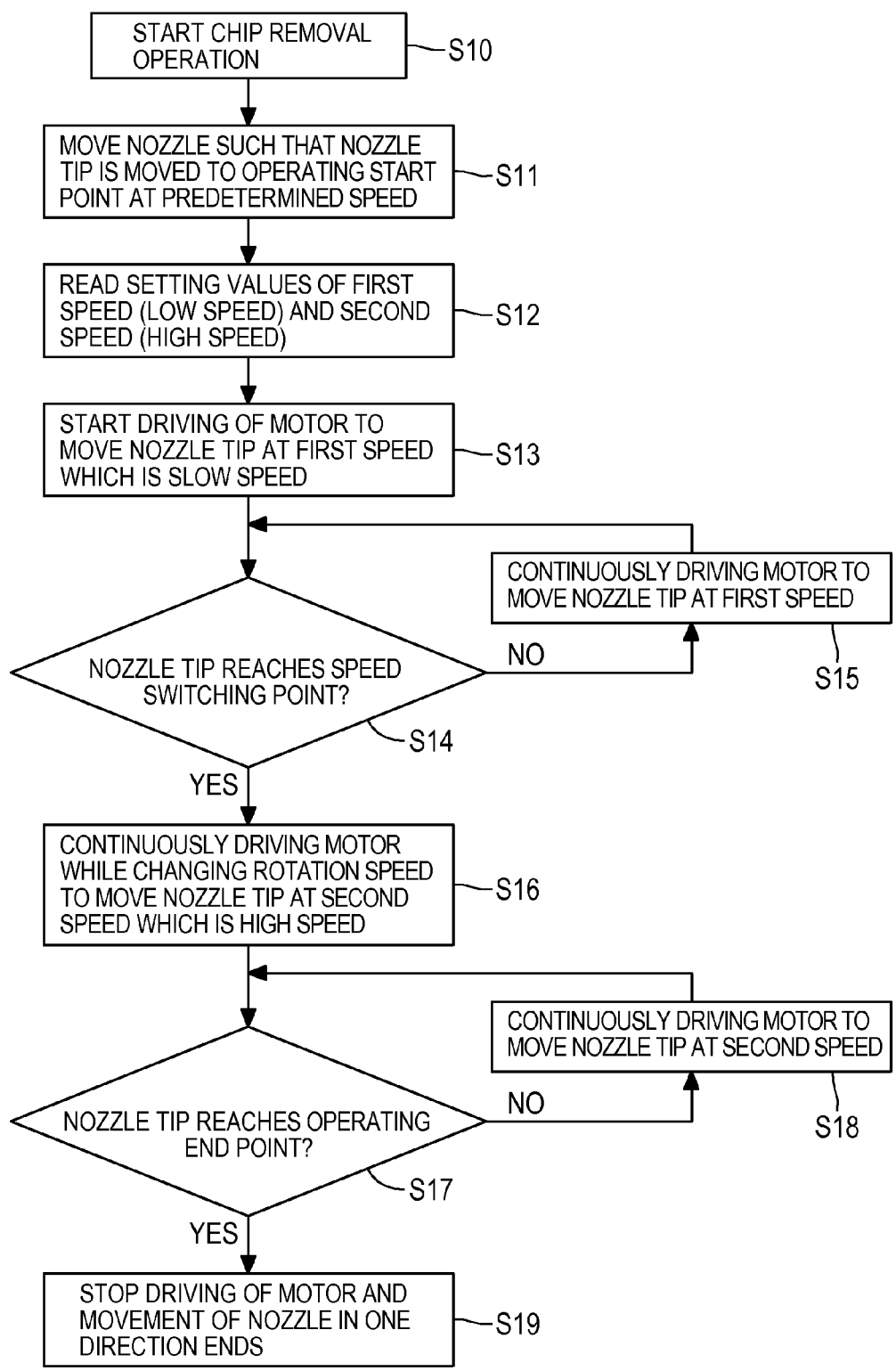
FIG. 2 is a flowchart for explaining an operation of a chip removal operation mode of the cutting fluid ejection apparatus shown in FIG. 1.

Next, an operation principle of the chip removal operation mode of the cutting fluid ejection apparatus 1 according to the present illustrative embodiment will be described with reference to a flowchart. FIG. 2 is a flowchart for explaining an operation of the chip removal operation mode of the cutting fluid ejection apparatus 1 shown in FIG. 1. Prior to performing an operation in the chip removal operation mode, the above-described various setting values, that is, setting values such as the operating start point, the operating end point, the speed switching point and the angular movement speeds, or table values in the second illustrative embodiment (will be described later) are inputted to the memory of the motor controller 32, in advance.

As the mode of the cutting fluid ejection apparatus 1 is switched from the cutting fluid supply operation mode to the chip removal operation mode, a chip removal operation is started (Step S10). Then, the motor 21 is driven to move the cutting fluid ejection nozzle tip 10a to the operating start point in a predetermined angular movement speed (Step S11). Next, the angular movement speed which is preset in the memory of the motor controller 32 is read into a control circuit of the motor controller 32 (Step S12). Here, the angular movement speed is the first speed V1 where the direction of the cutting fluid ejection nozzle tip 10a is changed at a low speed, or the second speed V2 where the direction of the cutting fluid ejection nozzle tip 10a is changed at a high speed. And, the driving of the motor 21 is started, and the cutting fluid ejection nozzle tip 10a is moved at the first speed V1 where the direction is changed at the low speed while ejecting a constant amount of cutting fluid (Step S13). Next, it is determined whether the cutting fluid ejection nozzle tip 10a reaches the speed switching point Pc (Step S14). When it is determined that the cutting fluid ejection nozzle tip 10a does not reach the speed switching point Pc, the driving operation of the motor 21 is continued such that the cutting fluid ejection nozzle tip 10a is moved while maintaining the first speed V1 which is the low speed (Step S15). On the other hand, when it is determined that the cutting fluid ejection nozzle tip 10a reaches the speed switching point Pc, the motor 21 is driven at an increased rotation number such that the cutting fluid ejection nozzle tip 10a is moved at the second speed V2 which is the high speed (Step S16). By doing so, the cutting fluid ejection nozzle tip 10a is moved at the high-speed angular movement speed V2. A constant amount of cutting fluid is continuously ejected to the tool 51 from the cutting fluid ejection nozzle tip 10a, even during those movements of the cutting fluid ejection nozzle 10. Next, it is determined whether the cutting fluid ejection nozzle tip 10a reaches the operating end point (Step S17). Here, when it is determined that the cutting fluid ejection nozzle tip 10a does not reach the operating end point, the motor 21 is continuously driven without changing the rotation number thereof such that the cutting fluid ejection nozzle tip 10a is moved at the second speed V2 which is the high speed (Step S18). On the other hand, when it is determined that the cutting fluid ejection nozzle tip 10a reaches the operating end point, the driving of the motor 21 is stopped and a movement routine of the cutting fluid ejection nozzle tip 10a in one direction is ended (Step S19).

Next, an example of an actual operation of the cutting fluid ejection nozzle 10 according to the present illustrative embodiment is described. FIGS. 3A and 3B are views for explaining the operation of the chip removal operation mode of the cutting fluid ejection apparatus 1 shown in FIG. 1. FIG. 3A is a view for explaining the movement of the cutting fluid ejection nozzle tip from the movement start point (tip position Ps of the cutting fluid ejection nozzle 10 indicated by broken line in FIG. 3A) to the movement end point (tip position Pe of the cutting fluid ejection nozzle 10 indicated by solid line in FIG. 3A) and shows the movement of the cutting fluid ejection nozzle 10 in a forward direction. FIG. 3B is a view for explaining the movement of the cutting fluid ejection nozzle tip from the movement start point (tip position Ps of the cutting fluid ejection nozzle 10 indicated by dotted line in FIG. 3B) to the movement end point (tip position Pe of the cutting fluid ejection nozzle 10 indicated by solid line in FIG. 3B) and shows the movement of the cutting fluid ejection nozzle 10 in a backward direction.

The workpiece 61 held by a chuck 62 provided at the NC lathe 60 is rotated according to the rotating movement of the chuck 62. Further, the tool 51 supported by a tool holding part 50 provided at the NC lathe 60 is pressed against the rotating workpiece 61 to cut the workpiece 61 into a desired shape. In this workpiece processing process, fine chips or complex-shaped chips 65 are adhered to the tool 51. Further, the fine chips are removed by the cutting fluid 90 supplied to the tool 51 during the processing process. However, the chips 65 which are caught to the tool 51 due to their complex shape may be still adhered to the tool 51, even if the cutting fluid 90 is strongly ejected onto the tool 51 during the processing process.

In the present illustrative embodiment, when the processing operation for the workpiece 61 is performed a predetermined number of times (for a predetermined time), the processing machine controller 33 controls to automatically perform switching from the cutting fluid supply operation mode to the chip removal operation mode (automatic mode switching). On the other hand, the switching between the cutting fluid supply operation mode and the chip removal operation mode may be performed as follows. That is, the switching from the cutting fluid supply operation mode to the chip removal operation mode may be manually performed when an operator estimates that the chips 65 are adhered to the tool 51 to some amount after the processing operation for the workpiece 61 is carried out or when it is visually confirmed that the chips 65 are adhered to the tool to some amount (manual mode switching). In FIGS. 3A and 3B, as the operation mode is switched, the workpiece 61 indicated by two-dot chain line is separated from the chuck 62 of the NC lathe 60. However, the automatic mode switching or the manual mode switching may be performed in a state where the workpiece 61 is attached to the chuck 62.

When the switching from the cutting fluid supply operation mode to the chip removal operation mode is performed, the motor 21 is driven by the motor drive circuit 31 based on a signal from the motor controller 32 and thus the cutting fluid ejection nozzle tip 10a is moved to the operating start point Ps (this step corresponds to Step S11 in FIG. 2). In an operation in the forward direction shown in FIG. 3A, the operating start point Ps refers to a position where the cutting fluid ejection nozzle tip 10a is facing a tip end side of the tool 51 and the operating end point Pe refers to a position where the cutting fluid ejection nozzle tip 10a is facing a base end side (a side held by the tool holding part 50) of the tool 51. Further, the speed switching point Pc refers to a position where the cutting fluid ejection nozzle tip 10a is facing the tool such that the cutting fluid 90 reaches chips adhered to a center of the tool 51 in a longitudinal direction.

While the cutting fluid ejection nozzle tip 10a is moved in the forward direction shown in FIG. 3A, the cutting fluid ejection nozzle tip 10a is moved from the operating start point Ps to the speed switching point Pc at the first speed V1 which is the low speed. This corresponds to Step S13 to Step S15 in FIG. 2. Here, when the cutting fluid ejection nozzle tip 10a reaches the speed switching point Pc, the angular movement speed of the cutting fluid ejection nozzle tip 10a is changed into the second speed V2 which is the high speed. Then, the cutting fluid ejection nozzle tip 10a is moved from the speed switching point Pc to the operating end point Pe at the second speed V2 which is the high speed. This corresponds to Step S16 to Step S18 in FIG. 2. The angular movement speed of the cutting fluid ejection nozzle tip 10a at the speed switching point Pc is continuously changed (without interruption). In this way, the cutting fluid ejection nozzle tip 10a is continuously moved from the operating start point Ps to the operating end point Pe while ejecting a constant amount of cutting fluid 90. When the cutting fluid ejection nozzle tip 10a reaches the operating end point Pe, the driving operation of the motor is stopped and therefore the movement of the cutting fluid ejection nozzle tip 10a in the forward direction is ended. This corresponds to Step S17 and Step S18 in FIG. 2. In the above-described routine, the flowchart shown in FIG. 2 corresponds to the operation of the cutting fluid ejection nozzle in the forward direction from the operating start point Ps to the operating end point Pe.

Next, a moving operation of the cutting fluid ejection nozzle tip in the backward direction is described. When the cutting fluid ejection nozzle tip 10a reaches the operating end point Pe, the operating end point Pe is replaced with the operating start point Ps. Accordingly, in the operation in the backward direction shown in FIG. 3B, as opposite to the operation in the forward direction, the operating start point Ps refers to a position where the cutting fluid ejection nozzle tip 10a is facing the base end side of the tool 51, and the operating end point Pe refers to a position where the cutting fluid ejection nozzle tip 10a is facing the tip end side of the tool 51. Further, similarly to the operation in the forward direction, the speed switching point Pc refers to a position where the cutting fluid ejection nozzle tip 10a is facing the tool such that the cutting fluid 90 reaches chips adhered to a center of the tool 51 in a longitudinal direction. In the operation in the backward direction, the operating start point Ps and the operating end point Pe in the operation in the forward direction are replaced with each other and an operation control same as the operation in the forward direction is performed. Therefore, description for the principle of the operation in the backward direction is omitted.

Further, in the operation in the backward direction, when the cutting fluid ejection nozzle tip 10a reaches the operating end point Pe, the operating end point Pe is replaced with the operating start point Ps and a moving operation of the cutting fluid ejection nozzle tip 10a in the forward direction is started.

In this way, the cutting fluid ejection nozzle tip 10a performs a reciprocating action between the operating start point Ps and the operating end point Pe while ejecting a constant amount of cutting fluid 90 onto the tool 51, and this reciprocating action is performed a predetermined number of times which is set in the controller 30 in advance.

In the present illustrative embodiment, while the cutting fluid ejection nozzle tip 10a is moved in the forward direction and the backward direction as described above, the amount of the cutting fluid 90 ejected from the cutting fluid ejection nozzle tip 10a is always constant.

Figure 6:
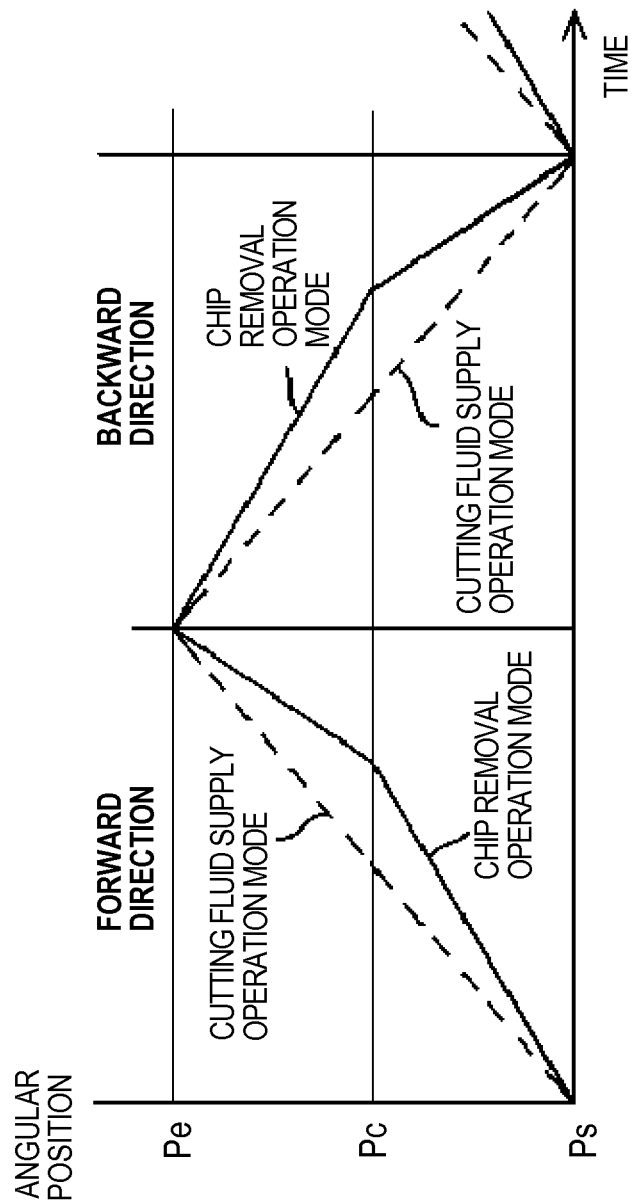
FIG. 6 is a view showing a first operational characteristic of a cutting fluid ejection nozzle according to an illustrative embodiment.

Next, an operation of the present illustrative embodiment will be described with reference to FIG. 6. FIG. 6 is a view showing a first operational characteristic of the cutting fluid ejection nozzle according to an illustrative embodiment. In addition to the operation in the chip removal operation mode, the operation in the cutting fluid supply operation mode is also indicated by broken line for comparison (same in FIG. 9 and FIG. 10). Since the cutting fluid ejection apparatus 1 is configured as described above, the angular movement speed of the cutting fluid ejection nozzle 10 is instantaneously switched from the first low-speed V1 to the second high-speed V2 at the speed switching point Pc, as shown in FIG. 6. Accordingly, the magnitude and direction of the jet force of the cutting fluid 90 ejected from the cutting fluid ejection nozzle 10 are abruptly changed, and therefore, it is possible to remove the chips 65 at once which are tangled and stuck to various tools 51. As a result, it is possible to remove the complex-shaped chips 65 which are tangled or caught or stuck to the tool 51, even if the tool 51 has various shapes or is made of various materials. Accordingly, a cumbersome work that the cutting fluid ejection apparatus or the processing machine is temporarily stopped and an operator manually removes the chips 65 as required in the apparatus of JP-A-Hei. 8-243876 is not required. Consequently, the processing machine can be continuously operated and thus it is possible to shorten the processing time of the workpiece.

Further, the large-size pump for adjusting the ejection pressure of the cutting fluid 90 as described in JP-A-Hei. 10-118884 is not required. Furthermore, since it is not necessary to manage the flow rate of the cutting fluid 90, a complicated device such as a flow control valve or a controller thereof which is needed to manage the flow rate of the cutting fluid 90 is not required. Accordingly, it is possible to reduce the manufacturing cost of the cutting fluid ejection apparatus 1.

In the present illustrative embodiment, the speed switching point Pc is set as a position of the cutting fluid ejection nozzle tip 10a where the cutting fluid 90 reaches a center of the tool 51 in a longitudinal direction. However, the speed switching point Pc may be properly changed according to the adhesion position of the chips 65.

Figure 4:
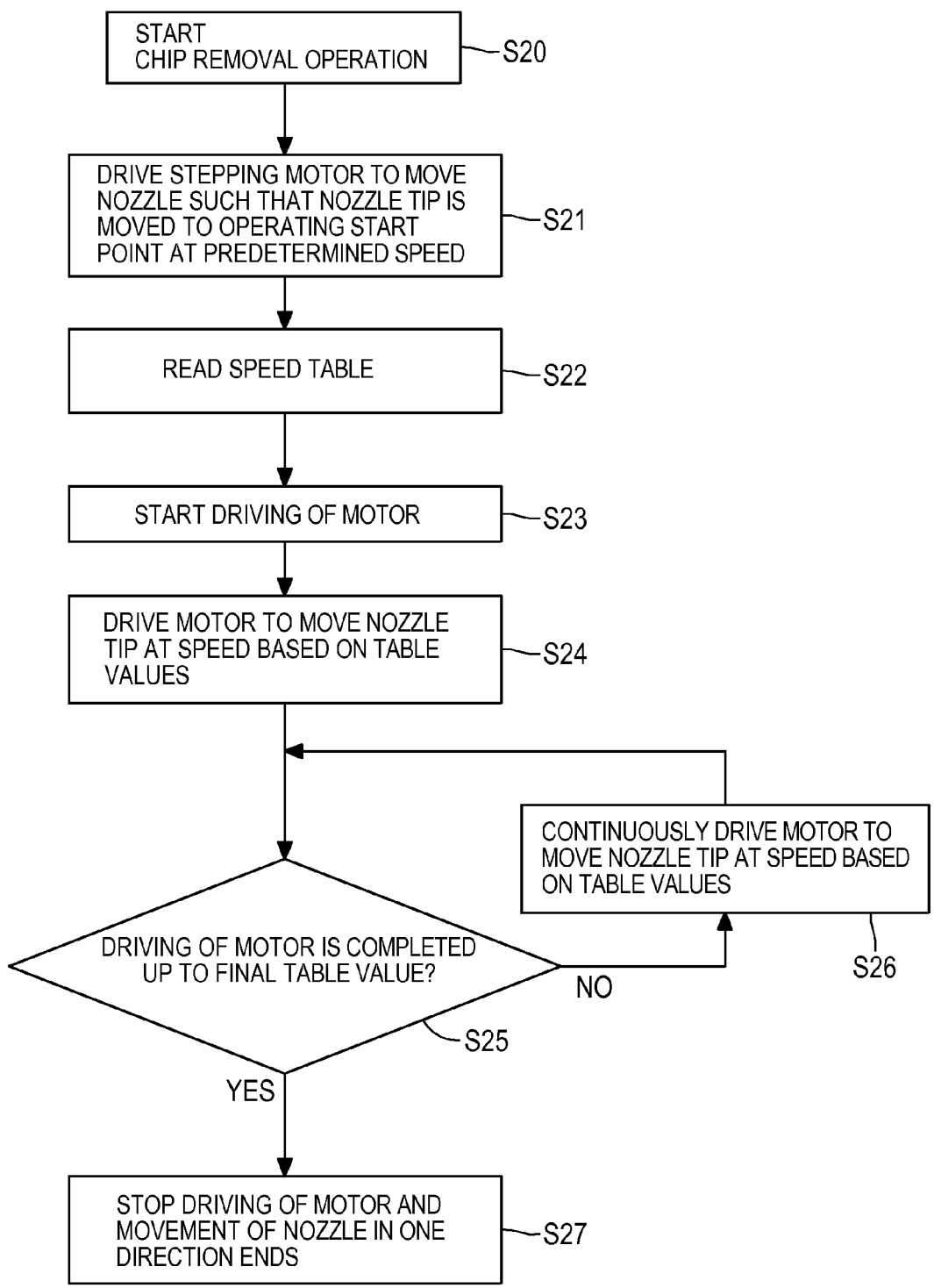
FIG. 4 is a flowchart for explaining an operation of a chip removal operation mode of the cutting fluid ejection apparatus according to a second illustrative embodiment.
Figure 5:
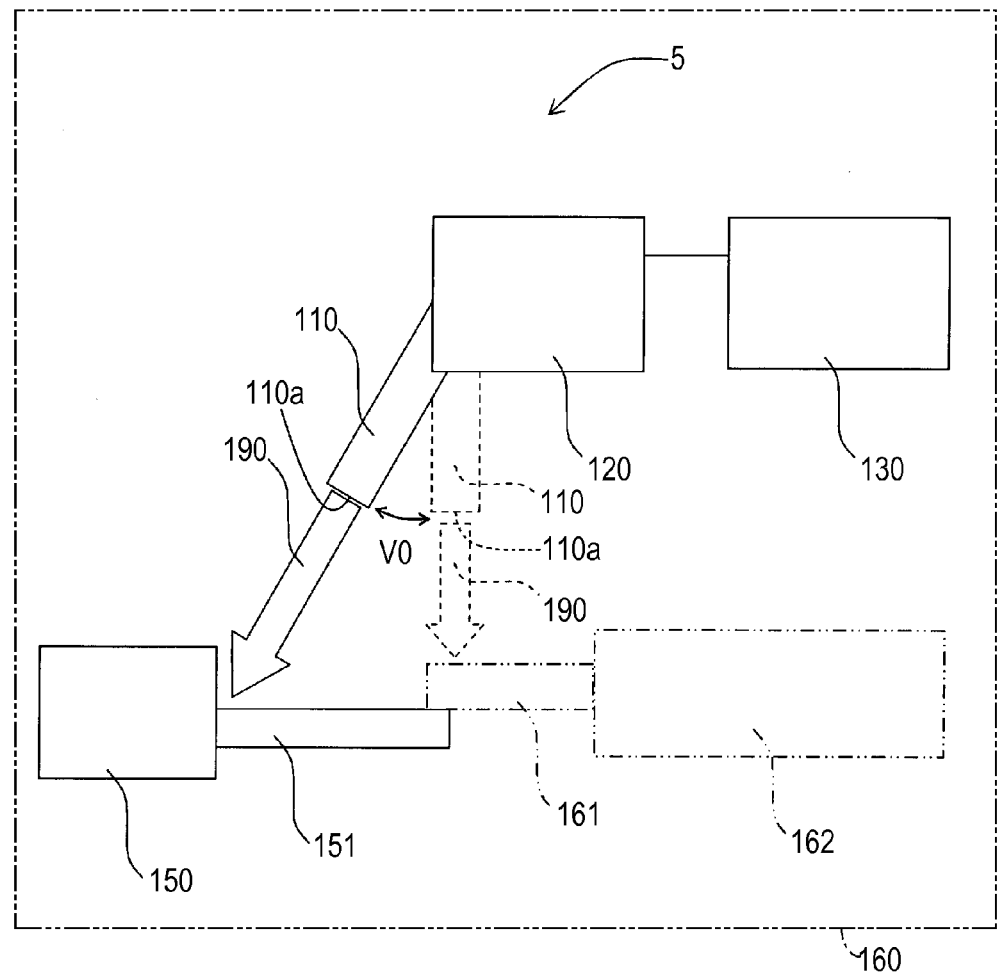
FIG. 5 is a schematic block diagram showing a related-art cutting fluid ejection apparatus.

Next, an operation principle according to a second illustrative embodiment is described with reference to the flowchart different from the flowchart of FIG. 2. This illustrative embodiment shows a case where a stepping motor is used as the motor 21. FIG. 4 is a flowchart for explaining an operation of a chip removal operation mode according to a second illustrative embodiment.

As the chip removal operation is started (Step S20), the stepping motor 21 is driven to move the cutting fluid ejection nozzle tip 10a to the operating start point Ps in a predetermined angular movement speed (Step S21). Next, the preset table values for driving the stepping motor and a specific pulse number corresponding to the table values are read in the motor control circuit from the memory of the motor controller 32 (Step S22) and the driving of the motor is started (Step S23). The motor 21 is driven such that the cutting fluid ejection nozzle tip 10a is moved at the angular movement speed based on the table values (Step S24). Herein, the table values have two stages. A first half of the two stages is set such that the stepping motor 21 is rotated in the low speed, and therefore, the cutting fluid ejection nozzle 10 is moved at the angular movement speed V1 which is the low speed. A second half of the two stages is set such that the stepping motor 21 is rotated in the high speed, and therefore, the cutting fluid ejection nozzle 10 is moved at the angular movement speed V2 which is the high speed. A switching point of the table values corresponds to the speed switching point Pc of the cutting fluid ejection nozzle 10.

Next, it is determined whether the operation is completed up to the final table value (Step S25). Here, when it is determined that the operation is not completed up to the final table value, the motor 21 is continuously driven such that the cutting fluid ejection nozzle tip 10a is moved at the angular movement speed based on the table values (Step S26). On the other hand, when it is determined that the operation is completed up to the final table value, the driving of the motor 21 is stopped and a movement routine of the cutting fluid ejection nozzle tip 10a in one direction is ended (Step S27).

Next, an example of an actual operation of this illustrative embodiment is described by using exemplary specific values to the table values. These values are values simplified in order to facilitate understanding of this illustrative embodiment.

In this illustrative embodiment, values 1 to 10 are stored as the table values in the memory of the motor controller 32. For ten table values, the drive pulse of the stepping motor in the table values 1 to 5 is set as 10 Hz, and the drive pulse of the stepping motor in the table values 6 to 10 is set as 100 Hz. In this way, for the table values 1 to 5, the cutting fluid ejection nozzle tip 10a is moved at the low speed V1. For the table values 6 to 10, the cutting fluid ejection nozzle tip 10a is moved at the high speed V2. Further, the table value 1 corresponds to the operating start point Ps, the table value 10 corresponds to the operating end point Pe and a switching point from the table value 5 to 6 corresponds to the speed switching point Pc.

While the cutting fluid ejection nozzle tip 10a is moved in the forward direction, the drive pulse of the stepping motor is set as 10 Hz in a range from the operating start point Ps to the speed switching point Pc and thus the cutting fluid ejection nozzle tip 10a is moved at the first low speed V1 based on the table values 1 to 5. And, the drive pulse of the stepping motor is set as 100 Hz in a range from the speed switching point Pc to the operating end point Pe and thus the cutting fluid ejection nozzle tip 10a is moved at the second high speed V2 based on the table values of 6 to 10. Further, the angular movement speed of the cutting fluid ejection nozzle tip 10a at the speed switching point Pc is continuously changed. In this way, the cutting fluid ejection nozzle 10 is moved from the operating start point Ps to the operating end point Pe while ejecting the cutting fluid 90 onto the tool 51 through the cutting fluid ejection nozzle tip 10a. The flowchart shown in FIG. 4 explains the operation of the cutting fluid ejection nozzle 10 in one direction from the operating start point Ps to the operating end point Pe.

Next, when the cutting fluid ejection nozzle tip 10a reaches the operating end point Pe, the operating end point Pe is replaced with the operating start point Ps, and a moving operation of the cutting fluid ejection nozzle tip 10a in the backward direction is started. In the operation in the backward direction, the operating start point Ps and the operating end point Pe in the operation in the forward direction are replaced with each other and an operation control same as the operation in the forward direction is performed. Therefore, description for the principle of the operation in the backward direction is omitted.

In this way, the cutting fluid ejection nozzle tip 10a performs a reciprocating action, similarly to the first illustrative embodiment. Thereby, the same effects as the first illustrative embodiment can be achieved. That is, since the angular movement speed of the cutting fluid ejection nozzle tip 10a is instantaneously accelerated at the speed switching point Pc, and the magnitude and direction of the jet force of the cutting fluid 90 ejected from the cutting fluid ejection nozzle 10 are abruptly changed, it is possible to remove the complex-shaped chips 65 at once which are tangled or caught or stuck to the tool 51.

Further, in the second illustrative embodiment, specific positions of the operating start point, the operating end point and the speed switching point are set based on the table values stored in the memory of the motor controller 32. Accordingly, in addition to the effects mentioned above, the operating start point, the operating end point and the speed switching point can be simply changed by changing a program. As a result, the operating start point, the operating end point and the speed switching point of the cutting fluid ejection nozzle tip 10a can be simply set in accordance with the position of the chips 65 to be removed, and therefore, it is possible to remove the chips 65.

Next, different operational characteristics of the cutting fluid ejection nozzle according to other illustrative embodiments are described with reference to FIGS. 7 to 11. FIGS. 7 to 11 are views showing the second to sixth operational characteristics of the cutting fluid ejection nozzle according to illustrative embodiments.

Figure 7:
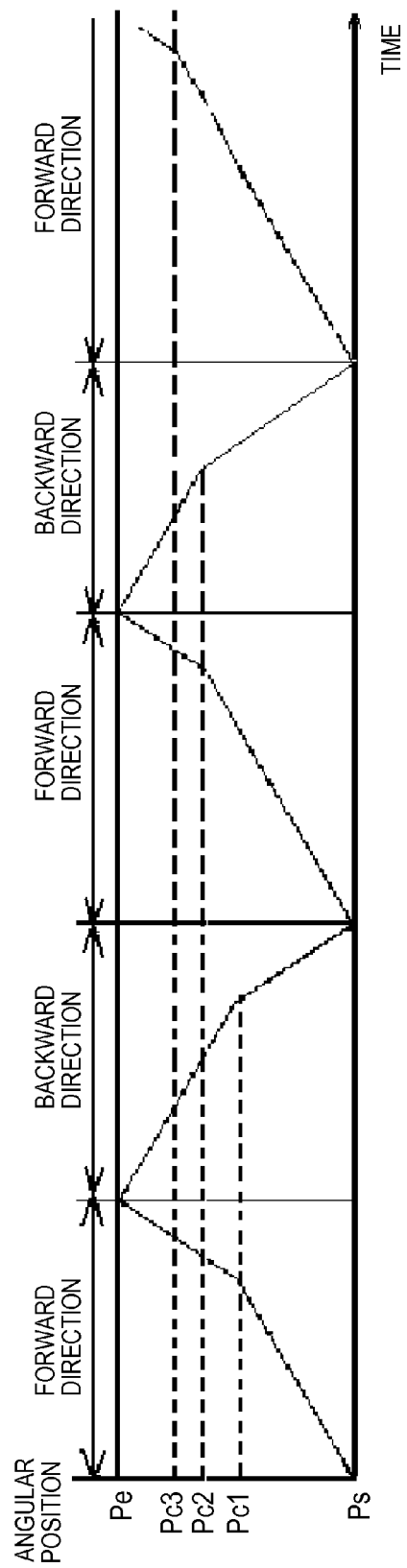
FIG. 7 is a view showing a second operational characteristic of a cutting fluid ejection nozzle according to an illustrative embodiment.

As shown in FIG. 7, the speed switching point may be set at a different position according to the reciprocating action of the cutting fluid ejection nozzle 10. That is, the speed switching point may be set so as to be gradually displaced from Pc1 to Pc2 and from Pc2 to Pc3. By setting the speed switching point in this way, the cutting fluid ejection nozzle tip 10a can follow the position of the chips 65, even if the chips 65 are shifted from an initial adhesion position due to the jet force of the cutting fluid 90. Accordingly, it is possible to remove the chips 65 in a short time. Further, the motor controller 32 can simply set the speed switching point of the cutting fluid ejection nozzle tip 10a to an optimal condition in which the chip removal effect is maximized, according to the shapes or materials of the tool 51.

Figure 8:
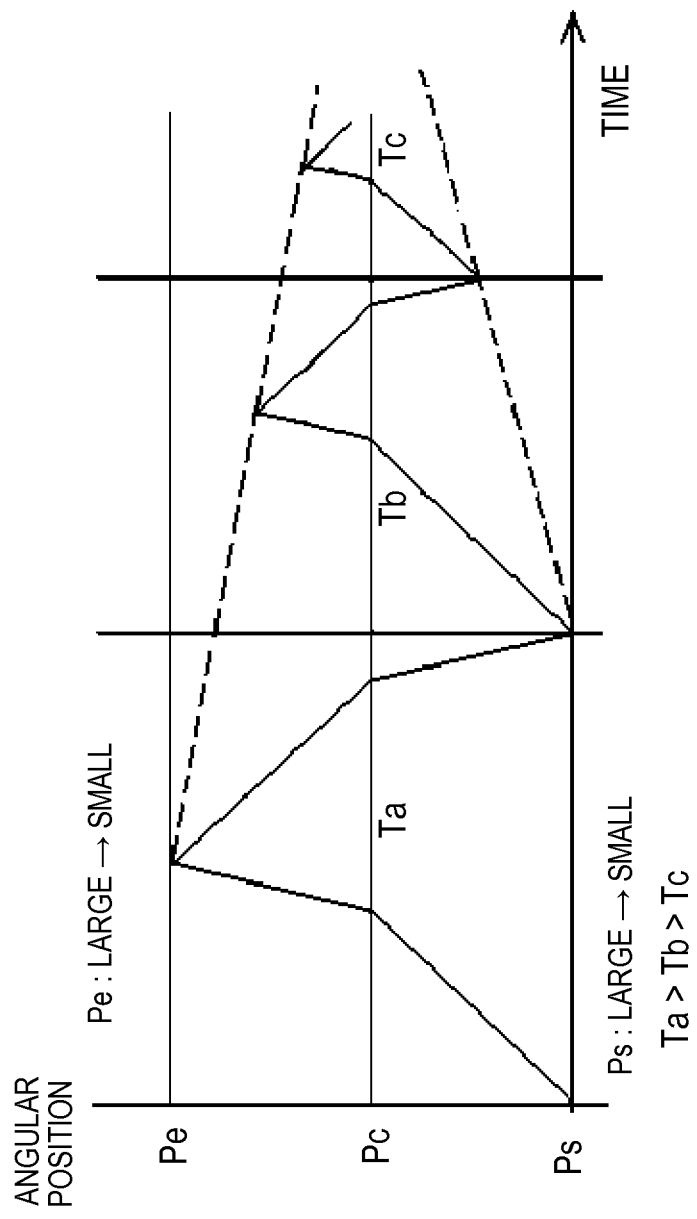
FIG. 8 is a view showing a third operational characteristic of a cutting fluid ejection nozzle according to an illustrative embodiment.

Although FIG. 7 shows an example where only the speed switching point is changed in accordance with the position of the chips 65, the operating start point or the operating end point may be changed in accordance with the position of the chips, as shown in FIG. 8. Thereby, the reciprocation action time of the cutting fluid ejection nozzle 10 is shortened. Further, it is possible to more properly remove the chips 65 according to the shapes or sticking condition of the chips 65 as well as the shapes and materials of the tool 51. In this way, since the motor controller 32 can simply set the first speed V1, the second speed V2 and the number of reciprocation to an optimal condition according to the amount of the chips 65 to be removed, it is possible to remove the chips 65 in accordance with various situations.

Figure 9:
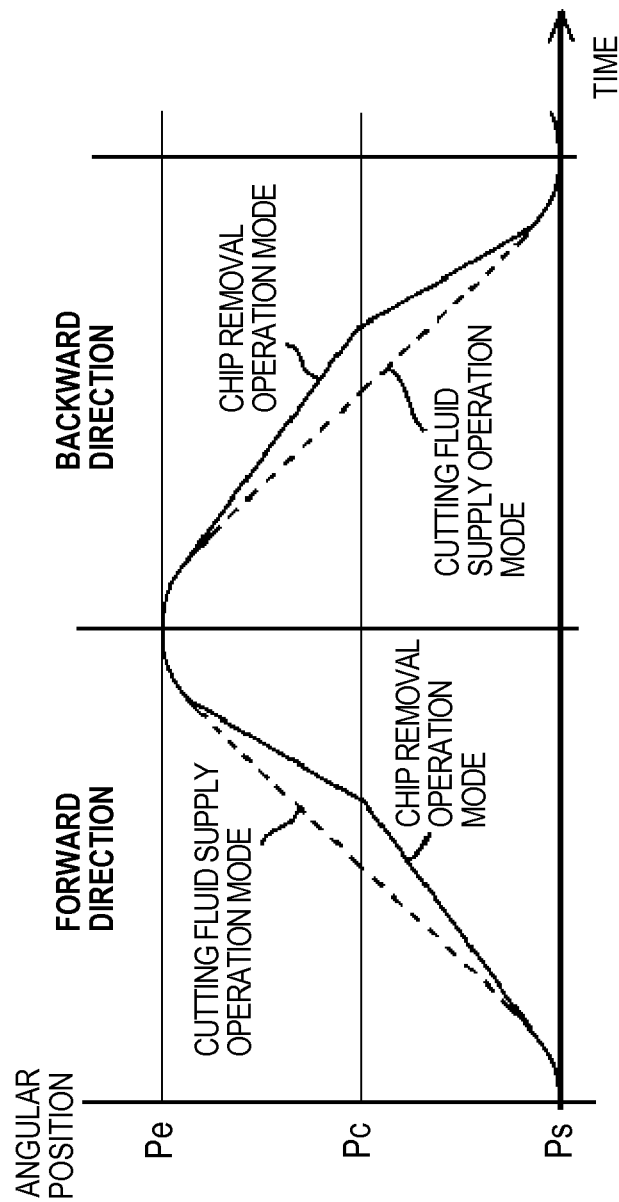
FIG. 9 is a view showing a fourth operational characteristic of a cutting fluid ejection nozzle according to an illustrative embodiment.

Further, in the above illustrative embodiment, when the movement of the cutting fluid ejection nozzle is switched from the forward direction to the backward direction or from the backward direction to the forward direction, the switching of the movement is instantaneously performed at the operating end point Pe. However, as shown in FIG. 9, control may be performed such that the cutting fluid ejection nozzle is gradually decelerated toward the operating end point Pe and temporarily stopped at the operating end point and then the switching of the movement is performed. When the movement of the cutting fluid ejection nozzle 10 is switched from the forward direction to the backward direction or from the backward direction to the forward direction, it is necessary to rotate the motor 21 in the opposite direction. However, if the rotation direction of the motor 21 is abruptly switched to the opposite direction, overload may be applied to the motor or the system and thus malfunction may be caused. Accordingly, since the cutting fluid ejection nozzle 10 can perform the reciprocating action without applying the overload to the motor or system by employing the configuration as described above, there is an advantage that the durability of the motor or system is improved.

Figure 10:
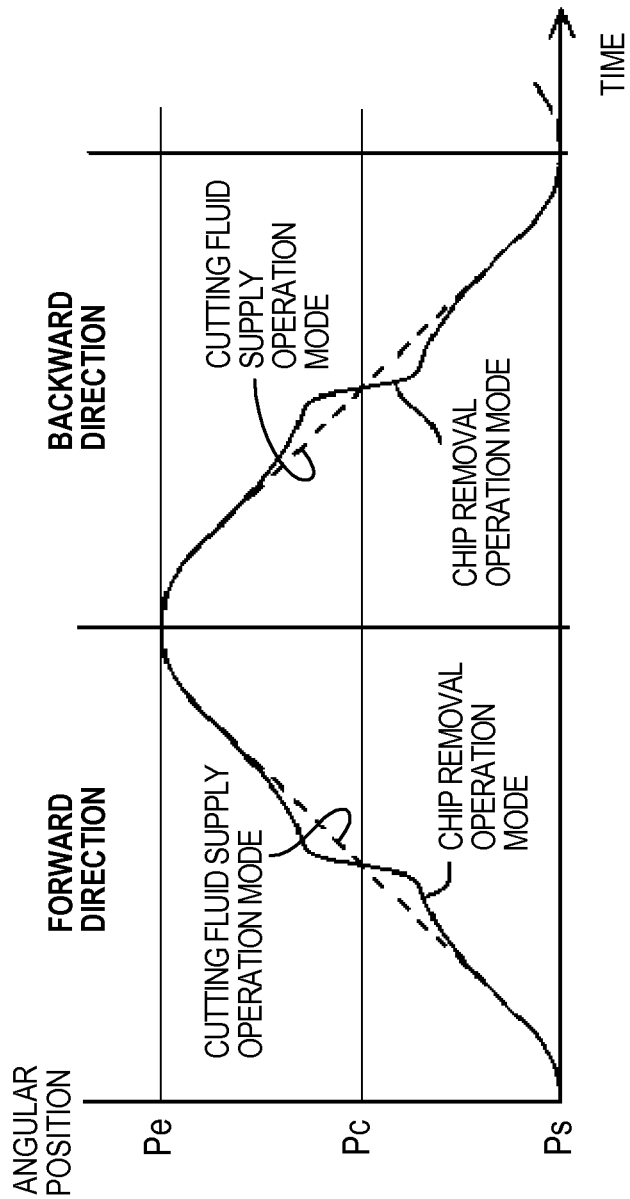
FIG. 10 is a view showing a fifth operational characteristic of a cutting fluid ejection nozzle according to an illustrative embodiment.

Further, in the above illustrative embodiment, the switching from the low speed to the high speed is performed at the speed switching point Pc. However, as shown in FIG. 10, control may be performed such that the rotation number of the motor 21 is abruptly increased in the vicinity of the speed switching point Pc and thus the angular movement speed of the cutting fluid ejection nozzle tip 10a is instantaneously increased and then slowly decelerated up to the switching point (the operating start point Ps or the operating end point Pe) between the forward direction to the backward direction. By performing such a control, the cutting fluid ejection nozzle 10 is instantaneously accelerated near the adhesion position of the chips 65 and therefore the magnitude or direction of the jet force of the cutting fluid 90 ejected from the cutting fluid ejection nozzle 10 is also instantaneously changed. Accordingly, the jet force of the cutting fluid 90 is instantaneously increased near the speed switching point Pc and thus it is possible to more effectively remove the chips which are tangled or stuck to the tool or the workpiece. In addition, at the position other than near the speed switching point Pc, the cutting fluid ejection nozzle reaches the operating start point Ps or the operating end point Pe while gradually decelerated. Accordingly, when the movement of the cutting fluid ejection nozzle is switched from the forward direction to the backward direction or from the backward direction to the forward direction, it is possible to prevent occurrence of overload due to the abrupt rotation of the motor 21 in the opposite direction.

Further, in the above illustrative embodiments, the cutting fluid ejection nozzle tip 10a is continuously moved from the operating start point to the operating end point of the chip removal operation mode, that is, in the forward direction and the backward direction. However, as shown in FIG. 11, the cutting fluid ejection nozzle 10 may be temporarily stopped at the speed switching point Pc of the fluid ejection nozzle tip 10a according to the types of the chips 65. According to this operation, since the direction of the cutting fluid ejection nozzle 10 can be adjusted to eject the cutting fluid 90 in accordance with the position of the chips 65, it is possible to effectively remove the chips 65. Thereby, the same effects as the above-described illustrative embodiments can be achieved.

The present invention is not limited to an example where the cutting fluid ejection nozzle is moved at a constant low speed from the operating start point to the speed switching point and then moved at a constant high speed from the speed switching point to the operating end point. The movement speed of the cutting fluid ejection nozzle may be gradually increased from the low speed or, on the contrary, may be gradually decreased from the high speed. With this operation, it is possible to remove the chips in various ways in accordance with the type of the tool, workpiece or the chips and the adhesion situation of the chips.

Furthermore, although the above illustrative embodiments has been described with reference to an example where the chips adhered to the tool of the NC lathe are removed, the present invention is not limited to this example. Of course, it is also possible to remove the chips adhered to a tool of the processing machine such as a milling machine or a drilling machine or a workpiece to be processed.

The operating start point and the operating end point of the cutting fluid ejection nozzle are not limited to those of the above illustrative embodiments. Specifically, for the workpiece 61 to which the chips 65 are liable to be caught or stuck, the chips 65 adhered to the workpiece 61 as well as the chips 65 caught or stuck to the tool 51 may be effectively removed by positioning any one of the operating start point and the operating end point of the cutting fluid ejection nozzle over the workpiece to be processed and switching the cutting fluid ejection nozzle into the chip removal operation mode in a state where the workpiece 61 after processing is held by the chuck. Accordingly, although only removal of the chips 65 caught or stuck to the tool 51 has been described in the above illustrative embodiments, the effects of the present invention can be achieved, even in a case where the cutting fluid 90 is ejected to both the tool 51 and the workpiece 61 or only the workpiece 61 in the chip removal operation mode.

Further, although the cutting fluid 90 is always ejected from the cutting fluid ejection nozzle 10 in the above illustrative embodiments, for example, the cutting fluid may be ejected only in the forward direction or the cutting fluid 90 may be ejected only in the backward direction. Thereby, when the tool 51 or the workpiece 61 has a special shape or is made of a special material and the sticking condition of the chips to the tool 61 is different from the normal sticking condition of the chips 65, the special chips can be removed by the ejection method of the cutting fluid 90 mentioned above.

Further, the shapes, dimensions, numerical values and materials of each component described in the above illustrative embodiments are only illustrative and may be variously selected without departing from the gist of the present invention.

What is claimed is:

1. A cutting fluid ejection apparatus comprising:
a cutting fluid ejection nozzle configured to supply a cutting fluid to a tool of a processing machine or a workpiece;
a drive motor configured to change a direction of the cutting fluid ejection nozzle in relation to said tool, in order to adjust an ejection angle of the cutting fluid ejection nozzle; and
a controller configured to control the drive motor,
wherein the controller is capable of performing control in a chip removal operation mode to remove a chip, and
wherein the controller is configured to control the drive motor to adjust the ejection angle of the cutting fluid ejection nozzle, during the chip removal operation mode, to comprise a first movement during which the direction of the cutting fluid ejection nozzle changes continuously at a first constant angular movement speed, followed by a second movement during which the direction of the cutting fluid ejection nozzle changes continuously at a second constant angular speed that is faster than the first constant angular movement speed.

2. The cutting fluid ejection apparatus according to claim 1, wherein the controller is configured to control the drive motor in the chip removal operation mode during processing of the workpiece by the processing machine.

3. The cutting fluid ejection apparatus according to claim 2,
wherein an ejection angle of the cutting fluid ejection nozzle which enables the cutting fluid to reach a chip adhered to the tool or the workpiece is set as a speed switching point, and
wherein an operating start point is set at a point where an operation of the cutting fluid ejection nozzle is started, and an operating end point is set at a point where the operation of the cutting fluid ejection nozzle is ended.

4. The cutting fluid ejection apparatus according to claim 3,
wherein the operating start point, the operating end point, the speed switching point, the angular movement speed and the number of reciprocation of the cutting fluid ejection nozzle in the chip removal operation mode are set in advance in the controller.

5. The cutting fluid ejection apparatus according to claim 4, wherein the controller controls the drive motor to control the cutting fluid ejection nozzle to be moved at the first movement before being moved at the second movement.

6. The cutting fluid ejection apparatus according to claim 4, wherein in the chip removal operation mode, the controller is configured to gradually decelerate the angular movement speed of the cutting fluid ejection nozzle as approaching the operating end point.

7. The cutting fluid ejection apparatus according to claim 4,
wherein the cutting fluid ejection nozzle is configured to perform a reciprocating action, and
wherein in the chip removal operation mode, when the cutting fluid ejection nozzle reaches the operating end point in a forward direction, the controller is configured to move the cutting fluid ejection nozzle in a backward direction while the operating start point of the forward direction is replaced with the operating end point of the backward direction and the operating end point of the forward direction is replaced with the operating start point of the backward direction.

8. The cutting fluid ejection apparatus according to claim 4, wherein:
the first movement is set to be from the operating start point to the speed switching point,
the second movement is set to be from the speed switching point to the operating end point, and
a boundary between the first movement and the second movement is set to be at the speed switching point.

9. The cutting fluid ejection apparatus according to claim 4, wherein during the chip removal operation mode, the controller controls the drive motor to adjust the direction of the cutting fluid ejection nozzle in order to adjust the ejection angle of the cutting fluid ejection nozzle to comprise a third movement between the first movement and the second movement, the third movement being set at a third constant angular movement speed that is faster than the first constant angular movement speed, and is also faster than the second constant angular movement speed.

10. A cutting fluid ejection apparatus comprising:
a cutting fluid ejection nozzle configured to supply a cutting fluid to a tool of a processing machine or a workpiece;
a drive motor configured to adjust an ejection angle of the cutting fluid ejection nozzle; and
a controller configured to control the drive motor to change a direction of the cutting fluid ejection nozzle in relation to said tool, in order to adjust the ejection angle of the cutting fluid ejection nozzle, during processing of the workpiece by the processing machine in a chip removal operation mode, to comprise a first movement during which the direction of the cutting fluid ejection nozzle changes continuously at a first constant angular movement speed, and a second movement during which the direction of the cutting fluid ejection nozzle changes continuously at a second constant angular speed that is faster than the first constant angular movement speed,
wherein:
an ejection angle of the cutting fluid ejection nozzle which enables the cutting fluid to reach a chip adhered to the tool or the workpiece is set as a speed switching point,
an operating start point is set at a point where an operation of the cutting fluid ejection nozzle is started,
an operating end point is set at a point where the operation of the cutting fluid ejection nozzle is ended, and
the operating start point, the operating end point, the speed switching point, the angular movement speed and a number of reciprocal movements of the cutting fluid ejection nozzle in the chip removal operation mode are set in advance in the controller.

11. The cutting fluid ejection apparatus according to claim 10, wherein the controller controls the drive motor to control the cutting fluid ejection nozzle to be moved at the first movement before being moved at the second movement.

12. The cutting fluid ejection apparatus according to claim 10, wherein in the chip removal operation mode, the controller is configured to gradually decelerate the angular movement speed of the cutting fluid ejection nozzle as approaching the operating end point.

13. The cutting fluid ejection apparatus according to claim 10,
wherein the cutting fluid ejection nozzle is configured to perform a reciprocating action, and
wherein in the chip removal operation mode, when the cutting fluid ejection nozzle reaches the operating end point in a forward direction, the controller is configured to move the cutting fluid ejection nozzle in a backward direction while the operating start point of the forward direction is replaced with the operating end point of the backward direction and the operating end point of the forward direction is replaced with the operating start point of the backward direction.

14. The cutting fluid ejection apparatus according to claim 10, wherein the first movement is set to be from the operating start point to the speed switching point, the second movement is set to be from the speed switching point to the operating end point, and a boundary between the first movement and the second movement is set to be at the speed switching point.

15. The cutting fluid ejection apparatus according to claim 10, wherein during the chip removal operation mode, the controller controls the drive motor to adjust the ejection angle of the cutting fluid ejection nozzle to comprise a third movement between the first movement and the second movement, the third movement being set at a third constant angular movement speed that is faster than the first constant angular movement speed, and is also faster than the second constant angular movement speed.

* * * * *